Patented Aug. 14, 1934

1,969,744

UNITED STATES PATENT OFFICE 1,969,744

SOLUTION OF INFUSIBLE AMINE-ALDE-HYDE CONDENSATION PRODUCTS AND PROCESS OF MAKING SAME

Alphonse Gams and Karl Frey, Basel, Switzerland, assignors, by mesne assignments, to the firm of Ciba Products Corporation, Dover, Del.

No Drawing. Application October 16, 1929, Serial No. 400,155. In Switzerland November 10, 1928

8 Claims. (Cl. 134—26)

This invention relates to solutions of synthetic resins from aromatic amines and aldehydes, especially from aniline and formaldehyde. It comprises the process of making such solutions, as well as the solutions themselves and their application in the industry of artificial materials and especially in the lacquer, varnish and impregnating industry.

It is known that by condensation of primary aromatic amines with more than equimolecular proportions of aldehydes, particularly formaldehyde, in the presence of acids and subsequent elimination of the acid, infusible products are obtained.

According to the conditions of working, these infusible condensation products are obtained in the form of amorphous powder which can be compressed to produce artificial masses, or in the form of directly moulded masses. They have proved applicable in various branches of the industry concerned with artificial materials.

Thus, for instance, in the copending specification Serial No. 245,039 filed Jan. 6, 1928, it has been shown that very valuable molded artificial materials may be obtained by subjecting such infusible condensation products in comminuted form to molding under pressure, if necessary at raised temperature.

In the copending specification Serial No. 398,267, filed Oct. 8, 1929, there is described a process of making infusible condensation products and molded artificial materials therefrom by treating a fusible condensation product, obtained by condensing a primary aromatic amine with not more than an equimolecular proportion of formaldehyde in presence of an acid and afterwards eliminating the acid, with an aldehydic hardening agent, the hardening being conveniently combined with the molding process.

In the copending specification Serial Number 398,268, filed Oct. 8, 1929, a special method for making filled molded infusible artificial materials from such infusible or fusible condensation products of primary aromatic amines and formaldehyde is described, consisting in impregnating the filling material with the acid aqueous solution of the condensation product in any stage of the condensation, and afterwards precipitating the condensation product within and upon the filling material by addition of an acid binding agent, eliminating the adherent liquid and molding the resulting product, if necessary in presence of an aldehydic hardening agent.

In the copending specification Serial Number 400,154, filed Oct. 16, 1929, it has been shown that similar infusible condensation products and molded artificial materials therefrom may be made by treating a Schiff's base, obtained by the condensation of equimolecular proportions of a primary aromatic amine and formaldehyde with a strong mineral acid and with an aldehyde compound, and afterwards eliminating the acid, the infusible condensation product thus obtained being then, for the manufacture of molded products, compressed, if necessary at raised temperature. If desired the treatment of the Schiff's base with the acid and with the aldehydic compound may, according to the said specification, be effected at successive stages, heating the Schiff's base first with an acid, then eliminating the acid, and finally hardening the resulting fusible resin with an aldehydic compound.

In the copending specification Serial No. 166,006, filed Feb. 4, 1927, a process is described for manufacturing infusible synthetic resins by causing primary aromatic amines to react, in presence of strong mineral acids, with a formaldehyde compound, then treating the latter with agents which substantially eliminate the mineral acid present, and finally, washing and drying the resulting material.

The valuable properties of this class of condensation products of primary aromatic amines with aldehydes indicate their applicability in the lacquer and varnish industry but their complete insolubility in the usual solvents has hitherto stood in the way of this application.

The present invention relates to a process of making solutions of infusible condensation products from aromatic amines and aldehydes by treating them with a chlorhydrin, such as glycolchlorhydrin or glyceroldichlorhydrin. This class of solvent will dissolve both the amorphous moulding powders and the moulded or compressed masses. It is also practicable to dissolve by means of this kind of solvent waste material, such as shavings or splinters produced during the working of the artificial materials, whereby these wastes can be used in further processes.

The solvent action may be enhanced, if desired, by addition of a swelling agent. Suitable swelling agents are cyclohexanone, lactic acid-ethyl ester, diethylphthalate, epichlorhydrin, glycerinformal and chloroform.

The dissolution can be accelerated by heating.

The solutions obtained are yellow to red brown. They may be mixed in large proportion with the usual solvents and diluents and may be incorporated with softening agents, agents imparting elasticity, dyestuffs, filling materials, for instance pigments, rubber, artificial or natural resins, cellulose derivatives and other bodies used as additions in the lacquer and varnish industry.

The solutions yield valuable liquors for impregnating and coating purposes.

The following examples illustrate the invention, the parts being by weight:—

*Example 1*

100 parts of a moulding powder, made by condensing 1 mol of aniline with 1.6 mol of formaldehyde in presence of 1 mol of hydrochloric acid, and eliminating the acid (cf. also Example 1 of specification No. 245,039), are dissolved in 1000 parts of glycolchlorhydrin by heating the powder with the solvent for 2 hours at 100°C. The brown, quite feebly opalescent solution thus obtained is applicable as a varnish on addition of the usually added materials.

*Example 2*

100 parts of a moulding powder, made by condensing 1 mol of anhydroformaldehyde anilin with 0.39 mol. of formaldehyde in the presence of 1 mol. of hydrochloric acid and subsequent elimination of the acid (see also Example 2 of specification No. 400,154), are heated with 250 parts of glycolchlorhydrin and 250 parts of epichlorhydrin until dissolution sets in. There is produced a somewhat brighter coloured solution than that obtained as described in Example 1.

*Example 3.*

100 parts of a moulding powder, made as described in Example 1, are heated with 500 parts of glyceroldichlorhydrin and 250 parts of cyclohexanone for a short time at 100° C.; a clear brown-red solution is produced.

The expression "formaldehyde-yielding compound" as employed herein, is intended to cover not only formaldehyde itself, but its polymers or any other substance splitting off formaldehyde or capable of forming methylene links under the conditions of the condensation, as it has been found that such substances or polymers may also be used in place of formaldehyde itself.

What we claim is:

1. A process of making solutions of infusible condensation products of a primary aromatic amine and a formaldehyde-yielding compound, which consists in treating the products with a chlorhydrin.

2. A process of making solutions of infusible condensation products of aniline and formaldehyde, which consists in treating the products with a chlorhydrin.

3. A process of making solutions of infusible condensation products of a primary aromatic amine and a formaldehyde-yielding compound, which consists in treating the products with a chlorhydrin in presence of a swelling agent.

4. A process of making solutions of infusible condensation products of aniline and formaldehyde, which consists in treating the products with a chlorhydrin in presence of a swelling agent.

5. As articles of manufacture solutions of infusible condensation products of a primary aromatic amine and a formaldehyde-yielding compound in a solvent containing a chlorhydrin, said solutions being useful as lacquers, varnishes, as impregnating materials and the like.

6. As articles of manufacture solutions of infusible condensation products of aniline and formaldehyde in a solvent containing a chlorhydrin, said solutions being useful as lacquers, varnishes, as impregnating materials and the like.

7. As articles of manufacture solutions of infusible condensation products of a primary aromatic amine and aldehydes in a solvent containing a chlorhydrin and a swelling agent, said solutions being useful as lacquers, varnishes, as impregnating materials and the like.

8. As articles of manufacture solutions of infusible condensation products of aniline and formaldehyde in a solvent containing a chlorhydrin and a swelling agent, said solutions being useful as lacquers, varnishes, as impregnating materials and the like.

ALPHONSE GAMS.
KARL FREY.